UNITED STATES PATENT OFFICE.

FRANK G. PERKINS, DECEASED, LATE OF LANSDALE, PENNSYLVANIA, BY GERTRUDE S. PERKINS, EXECUTRIX, OF SOUTH BEND, INDIANA, ASSIGNOR TO PERKINS GLUE COMPANY, A CORPORATION OF PENNSYLVANIA.

PROCESS FOR MAKING GLUE.

1,078,692. Specification of Letters Patent. Patented Nov. 18, 1913.

No Drawing. Application filed March 16, 1912. Serial No. 684,298.

*To all whom it may concern:*

Be it known that FRANK G. PERKINS, deceased, late a citizen of the United States, and a resident of Lansdale, borough of Lansdale, State of Pennsylvania, did invent certain new and useful Improvements Relating to a Process for Making Glue, of which the following is a specification.

The invention relates to improvements in processes for making vegetable glue and more particularly improvements over the processes claimed in Reissue Letters Patent No. 13,436 and Letters Patent No. 1,020,656.

According to the processes described in those patents, a suitable carbohydrate base was first treated to decrease its water absorptive properties, or so proportion the relative viscosity, cohesiveness and adhesiveness of the resulting product, when the carbohydrate was dissolved in about three (3) parts of water and a suitable solvent of cellulose, as caustic alkali, that the resulting product was suitable to glue up veneers. After this preliminary treatment, the carbohydrate was then, according to those processes, preferably dried and then dissolved in caustic and water to form glue. Therefore, in those processes, as more particularly described, the process was carried out in two operations, quite distinct from one another, thus necessitating very considerable time, labor and expense. Moreover those processes as generally carried out were such that the first operation was carried out at one factory and then the dried base shipped to the place where the glue was to be used, where the second or last operation was carried out.

One main object of the present invention is to so modify or improve those processes that the whole process may be carried out in one substantially continuous operation in shorter time, and with much less labor and expense, and so that large consumers will be enabled to make up their glue from raw carbohydrate in a simple and efficient manner and without installing any additional special apparatus.

The present invention in one form may be said to consist in suitably modifying the last step or operation of the processes described in said patents by prolonging the same with or without an increase in temperature whereby the caustic soda alone acts as a substitute for the caustic soda and peroxid of soda, or as a substitute for the acid or other suitable starch degenerating agents, to produce in the glue-dissolving kettle itself, a series of reactions by which the viscosity, cohesiveness and adhesiveness of the carbohydrates, when finally dissolved, shall be more or less affected simultaneously with, or in substantially the same operation as, the treatment which puts the carbohydrate into solution.

The success of this treatment depends to a considerable extent on the character of the carbohydrates used. Various starches and flours may be used but in each case the treatment should be slightly modified in order to adjust it to the particular characteristics of the raw material used. Even the same kinds of starch manufactured from plants of a different growth or found in a different locality, or even starches from the same plant separated by slightly different processes of manufacture, are found to differ sufficiently to require modification in the treatment. The starches or flours obtained from corn, wheat, potato, sago palm and the cassava plants have all been tried with success but for most purposes the most convenient and economical starches have proven to be those derived from the cassava plant and sold on the market as cassava flour of the grades M—4, M—5 or "Royal." Examples of the process as carried out with starches known as cassava M—4 and cassava M—5 and Royal, will first be given and then a more general specification will be given, by which anyone skilled in the art may apply the process to other flours and starches and produce usable results, and by slight adjustment of this general treatment it may be readily modified to adapt itself more particularly to the starch in question, and produce increasingly satisfactory results, as will be understood by those skilled in the art.

Example 1: 250 pounds of dry cassava flour, grade M—4, is taken and mixed with about 750 parts of water. This mixture is made by first adding about 300 of the 750 parts of water and stirring thoroughly until the mixture is complete, after which the balance of the water may be rapidly added. The whole should then be stirred as thoroughly as possible for at least one-half hour. Slightly better results are believed to be obtained by continuing the stirring or at least allowing the batch to stand at rest over night, and then stirring up again, but for commercial purposes one-half hour is all that is regarded as important. If it is desired to have a more fluid glue, it is preferred to have the water heated to about 115 or 120° Fahrenheit when the starch is added, or to have the apparatus arranged in such a manner that heat can be gently applied during the stirring process, and the mass raised to 100 or 110° by the end of the half hour. If a stiff glue for application by specially heavy machinery is desired, this heating may be omitted. To the starch milk as above prepared, and while being strongly stirred and agitated, there is then added with extremely great slowness, 6½ to 7 per cent. of the weight of the starch of 76° caustic soda or an equivalent quantity of caustic potash dissolved in from 2 to 3 times its weight of water. If more water is used the proportion of water in the original mixture should be relatively reduced. If heat is to be omitted and the treatment made cold, a little larger per cent. of caustic is used, approximately 9 to 10 per cent. The rate of the addition of the caustic if continuous, should be made extremely slow, i. e., about one hour for one pint of liquid, or with the batch above described, using 250 pounds of flour and from 50 to 75 pounds of caustic solution, it would require 5 to 18 hours (preferably 18 hours) to add the solution, constantly stirring during this time. If heat is used the liquid may be added somewhat more rapidly, but by the slowness of addition and the degree of heat applied, together with the prolonged and violent stirring, the physical properties and, it is believed, the state of molecular aggregation of the starch in solution, is so affected that when put into solution by the complete addition of the caustic, the viscosity, cohesiveness and adhesiveness of the resulting mixture will be those recognized as desirable for use as a wood glue—that is, such that the resulting glue is capable of being applied by machinery and suitable for gluing up veneers. By increasing the temperature used the amount of caustic required is decreased, and time of operation is shortened.

During the first stages of the operation the caustic is added with such slowness or in such small quantities that tumefying or bursting of the carbohydrate as a whole is prevented, but the starch is altered to an extent sufficient to properly proportion the cohesiveness, adhesiveness and viscosity of the resulting glue, so that it is suitable to glue up veneers; and during the last stages of the operation the addition of caustic causes the whole carbohydrate to pass over or go into solution to form such a glue. During the passing over into solution during the last stages, it is noticed that the creamy batch has at first a faint mottled appearance, produced by the dissolving of some of the starch grains, which mottled appearance gradually increases until practically all of the starch has passed over to form a homogeneous colloidal compound of starch, water and caustic.

Example 2: M—5 cassava flour mixed with 2¾ times its weight of water, to which has been added heat enough to raise it to about 140° Fahrenheit, is slowly treated with a solution of 2 per cent. of its weight of 76° caustic soda in from 2 to 3 parts of water,—the rate of addition of the caustic solution being such as to occupy about 20 minutes, during which time the temperature shall be maintained and preferably raised to 150 or 160° Fahrenheit.

Example 3: The grade of cassava flour sold on the market as "Royal" is suspended in 2¾ times its weight of water by constant stirring and while continuing the stirring, heat is applied, or the original water may have been heated to such a temperature that the temperature of the resulting mixture when made, approximates 100° Fahrenheit. The batch is stirred for ¾ of an hour at substantially this temperature and there is then added to it 7 per cent. of the weight of the starch, of caustic soda in the form of a solution in three parts of water, the temperature and stirring being maintained throughout this time, and the caustic solution added at a rate such that the addition of the solution occupies about 3 hours, during at least the first half of which the temperature is maintained above 100°.

The above examples are given as specific for certain products. The gradual and substantially equable addition of solution of caustic is advantageous for ordinary practical purposes. It seems that the effect of the caustic in the first stages is most satisfactory and rapid when the caustic itself is present in such proportions that the mixture will assume a white creamy consistency, i. e., that some small portion of the starch granules are dissolved. The action of a portion of the starch dissolved in the caustic soda appears to be similar in character to the combined action of caustic soda and peroxid of soda on the remaining starch not dissolved. Since it requires a little more skill to take advantage of this process of treating the starch, a final example illustrating a method more generally applicable to other suitable starches that have been tried so far, will be given.

Example 4: Any suitable starch or flour mixed up to a milk, with from 2 to about 4 times its weight of water, according to the density of glue desired, and heated to 130° Fahrenheit by such gradual application of heat that the starch itself shall not be tumefied, is then treated with constant stirring by addition of about 4 per cent. of its weight of 76° caustic soda dissolved in three parts of water to one of caustic soda. With some starches all of this 4 per cent. may not be required, and with some others, slightly more, but the addition of the caustic soda solution is continued to that point where the batch while being stirred assumes the white creamy consistency, but does not show much tendency to agglutinate in transparent masses of considerable size. When this point is reached and while maintaining the temperature, stirring is continued for from one-half to ¾ of an hour, after which an additional amount of similar caustic soda solution is added to bring the total amount of caustic soda up to about 7 to 10 per cent. In other words, about 3 to 6 per cent. more of caustic is added to the batch, after which the batch is thoroughly stirred for a short time to put the carbohydrate into solution and to equalize its consistency and composition, and then the batch is preferably allowed to stand for an hour or two before used as a glue.

It will be obvious in all these examples, that the treatment has been such as to permit a portion of the caustic soda used, to act either alone or together with heat, upon the undissolved starch granule, for a period depending on the strength of the caustic and the temperature used. It is believed that a certain portion of the outside integuments of the starch granules, i. e., the portion having the higher molecular weight, is dissolved during this preliminary treatment, and distributed throughout the liquid in such a manner that when the starch granule itself is dissolved by the interior portion being liberated and passing into solution, the viscosity of the two is equalized and possibly some form of molecular combination generated between the two in the viscous colloidal liquid produced in such a manner that the mean viscosity, cohesiveness and adhesiveness of the mixture is properly proportioned to produce glue having a final adhesiveness when properly applied and dried, substantially as great as the best animal glue and suitable for gluing up veneers. Whether the action is exclusively that of the caustic upon the granule, or whether there is some combined action between the various parts of the granule as just indicated, is not certain, but certainly a different and much more profound change is produced by the slow addition or prolonged action of the caustic, or addition of the caustic in small quantities at first (together with temperature) than the slight difference of rate in adding the caustic soda solution would be expected to yield. In other words, it is found that starches which when dissolved in the ordinary manner in caustic soda would show products with such a viscosity that it would be impossible to use them satisfactorily as glue to be applied by machinery, yet when dissolved in this way by the extremely slow addition of caustic together with a suitable temperature, in case it is desired to hasten the action of the caustic, produce semi-fluid glues which can conveniently be applied by machinery and which have all the desired valuable properties of the animal glue for flat gluing, such as gluing up wood veneers. It will be obvious also that different starches require different treatment, but that the same underlying principles control the application, which principles will be readily applied by those skilled in the art, from the examples above given, to other starches of somewhat different character. It is therefore clear that the invention in its broader aspects is not limited to the particular carbohydrates, temperatures or percentages stated, nor to the use of caustic soda alone, as other carbohydrates such as certain grades of celluloses or hemi-celluloses, and other temperatures and percentages, and other caustics such as caustic potash and other solvents of cellulose, such as for instance sodium xanthate, sodium silicate, zinc chlorid and basic lead acetate, will readily suggest themselves to those skilled in the art to meet the peculiar exigencies of each case.

Having fully and clearly described the invention, what is claimed as new and what is desired to be secured by Letters Patent, is:

1. The improved process of making glue, which consists in suspending cassava carbohydrate in water and then adding, with substantially continuous stirring, a solution of caustic alkali with such slowness that tumefying or bursting of the carbohydrate as a whole is avoided during a substantial part of the first stages of the treatment, to proportion the viscosity, cohesiveness and adhesiveness of the resulting glue, so that upon the continued addition of the caustic, and during the last stages thereof, the batch passes over into a semi-fluid glue capable of being applied by machinery, the total amount of water in the glue being about 4 parts or less by weight of dry carbohydrate.

2. The improved process of making vegetable glue which consists in suspending a suitable vegetable carbohydrate in water, and then treating the batch with such an amount of a solvent of cellulose, as caustic alkali, that tumefying or bursting of the carbohydrate as a whole is avoided, and such that the viscosity, cohesiveness and adhesiveness of the resulting glue is so proportioned as to make it suitable to glue up veneers, and then adding more solvent of cellulose to the batch until the batch passes over into a semi-fluid glue capable of being applied by machinery, and suitable for gluing up veneers.

3. The improved process of making a wood glue, which consists in suspending a starchy carbohydrate in water, then agitating or stirring the batch and adding caustic alkali in such an amount that tumefying or bursting of the carbohydrate as a whole is avoided, and such that the viscosity, cohesiveness and adhesiveness of the resulting glue is so proportioned as to make it suitable to glue up veneers, and then agitating or stirring the batch and adding more caustic until it passes over into a semi-fluid glue capable of being applied by machinery, and having an adhesiveness substantially as great as good animal glue.

4. The improved process of making a wood glue, which consists in suspending a starchy carbohydrate in water, then agitating or stirring the batch and adding caustic alkali in such an amount that tumefying or bursting of the carbohydrate as a whole is avoided, and such that the viscosity, cohesiveness and adhesiveness of the resulting glue is so proportioned as to make it suitable to glue up veneers, and then agitating or stirring the batch and adding more caustic until it passes over into a semi-fluid glue capable of being applied by machinery, and suitable for gluing up wood veneers, the total amount of water used being about 4 parts or less by weight of dry carbohydrate.

5. The improved process of making vegetable glue, which consists in suspending a suitable vegetable carbohydrate in water, heating the batch to about 100° Fahrenheit or more, and then treating the batch with such a quantity of a solvent of cellulose, as caustic alkali, that tumefying or bursting of the carbohydrate as a whole is avoided, and such that the viscosity, cohesiveness and adhesiveness of the resulting glue is so proportioned as to make it suitable to glue up veneers, and then adding more of the solvent of cellulose to the batch until the batch passes over into a semi-fluid glue capable of being applied by machinery, and suitable to glue up wood veneers.

6. The improved process of making a wood glue, which consists in suspending a starchy carbohydrate in water, then agitating or stirring the batch and adding caustic alkali in such amount that tumefying or bursting of the carbohydrate as a whole is avoided, and such that the viscosity, cohesiveness and adhesiveness of the resulting glue is so proportioned as to make it suitable to glue up veneers, and then agitating or stirring the batch and adding more caustic until it passes over into a semi-fluid glue capable of being applied by machinery and having a final adhesiveness substantially as great as good animal glue, the total amount of water used being about 3 parts or less by weight of dry carbohydrate, and the batch being heated to about 100° Fahrenheit, or more.

7. The improved process of making vegetable glue, which consists in suspending a suitable vegetable carbohydrate in water, and stirring the batch for about one-half hour or more, and then treating the batch with such small quantities of a solvent of cellulose, as caustic alkali, that tumefying or bursting of the carbohydrate as a whole is avoided, and such that the viscosity, cohesiveness and adhesiveness of the resulting glue is so proportioned as to make it suitable to glue up veneers, and then adding more solvent of cellulose to the batch until the batch passes over into a semi-fluid glue capable of being applied by machinery, and suitable for gluing up veneers.

8. The improved process of making vegetable glue which consists in suspending cassava carbohydrate in water, and stirring the batch for about one-half hour or more, and then heating to about 100° Fahrenheit, or more, and treating the batch with such small quantities of a solvent of cellulose, as caustic alkali, that tumefying or bursting of the carbohydrate as a whole is avoided, to proportion the viscosity, cohesiveness and adhesiveness of the resulting glue, so that it is suitable to glue up veneers, and then adding more of the solvent of cellulose to the batch until the batch passes over into a semi-fluid glue capable of being applied by machinery, and having an adhesiveness substantially as great as good animal glue, the total amount of water used being about 4 parts or less by weight of dry carbohydrate.

9. The improved process of making vegetable glue, which consists in treating a suitable vegetable carbohydrate with water and with such an amount of a solvent of cellulose that tumefying or bursting of the carbohydrate as a whole is avoided, and such that the viscosity, cohesiveness and adhesiveness of the resulting glue are so proportioned as to make it suitable to glue up veneers, and then further treating the batch with said solvent until the batch passes over into a semi-fluid glue capable of being applied by machinery, and suitable for gluing up veneers.

10. The improved process of making vegetable glue, which consists in treating a suitable vegetable carbohydrate with water and with such an amount of a solvent of cellulose that tumefying or bursting of the carbohydrate as a whole is avoided, and such that the viscosity, cohesiveness and adhesiveness of the resulting glue are so proportioned as to make it suitable to glue up veneers, and then further treating the batch with said solvent and with additional heating until the batch passes over into a semi-fluid glue capable of being applied by machinery, and suitable for gluing wood.

In testimony whereof I have signed my name to this specification in the presence of two subscribing witnesses.

GERTRUDE S. PERKINS,
*Executrix of the estate of Frank G. Perkins.*

Witnesses:
GORHAM CROSBY,
EDWIN SEGER.